(12) United States Patent (10) Patent No.: US 8,775,102 B2
Heatley et al. (45) Date of Patent: Jul. 8, 2014

(54) PASSIVE REMOTE DETECTION OF GAS FLOW AND CABLE ARRIVAL

(75) Inventors: David John Taylor Heatley, Suffolk (GB); Ian Neild, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 353 days.

(21) Appl. No.: 13/257,440

(22) PCT Filed: Mar. 18, 2010

(86) PCT No.: PCT/GB2010/000487
§ 371 (c)(1),
(2), (4) Date: Sep. 19, 2011

(87) PCT Pub. No.: WO2010/106323
PCT Pub. Date: Sep. 23, 2010

(65) Prior Publication Data
US 2012/0029846 A1    Feb. 2, 2012

(30) Foreign Application Priority Data
Mar. 19, 2009    (EP) ..................................... 09250757

(51) Int. Cl.
*G01H 17/00*    (2006.01)
*G02B 6/44*    (2006.01)

(52) U.S. Cl.
CPC ............ *G02B 6/4464* (2013.01); *G02B 6/4463* (2013.01); *G02B 6/4466* (2013.01); *G02B 6/447* (2013.01)
USPC .................. 702/48; 702/56; 73/1.82; 73/585; 73/587; 73/579

(58) Field of Classification Search
CPC .. G02B 6/4463; G02B 6/4464; G02B 6/4466; G02B 6/447
USPC ............................................. 702/48; 73/1.82
See application file for complete search history.

(56) References Cited

U.S. PATENT DOCUMENTS 3,814,935 A    6/1974    Kissel
4,357,918 A    11/1982    Asano
(Continued)

FOREIGN PATENT DOCUMENTS

DE    4202147    7/1993
DE    19649556    6/1998
(Continued)

OTHER PUBLICATIONS

IEEE Guide for the Design and Installation of Cable Systems in Substations. Apr. 2008. 132 pages.
(Continued)

*Primary Examiner* — John Breene
*Assistant Examiner* — Timothy H Hwang
(74) *Attorney, Agent, or Firm* — Patterson Thuente Pedersen, P.A.

(57) ABSTRACT

A system for use in installation of blown fiber for detecting a signal indicative of presence of at least one of a gas flow or an optical fiber at a remote location, comprising a gas vibration detector configured to acoustically couple with an installation duct through which the signal can travel after its generation at the remote location, and a processor arranged to receive an input from the vibration detector and to process the input to identify the signal present within the input; and a sensor for generating the signal upon sensing the presence of at least one of the gas flow or the optical fiber at the remote location. The signal can be provided by a whistle mounted on the remote end of the installation duct. The vibration sensor is typically a microphone.

17 Claims, 5 Drawing Sheets

(56) References Cited

U.S. PATENT DOCUMENTS

| | | | |
|---|---|---|---|
| 4,471,651 | A | 9/1984 | Dimeff et al. |
| 4,856,937 | A | 8/1989 | Grocott et al. |
| 4,880,484 | A | 11/1989 | Obermeier et al. |
| 4,948,219 | A | 8/1990 | Seino et al. |
| 5,002,090 | A | 3/1991 | Ichikawa et al. |
| 5,109,598 | A | 5/1992 | Koch |
| 5,121,644 | A | 6/1992 | Grey et al. |
| 5,143,353 | A | 9/1992 | Sano et al. |
| 5,199,689 | A | 4/1993 | Proud et al. |
| 5,211,377 | A | 5/1993 | Griffioen et al. |
| 5,248,128 | A * | 9/1993 | Warren et al. ............... 254/134.4 |
| 5,467,968 | A | 11/1995 | Proud et al. |
| 5,699,996 | A | 12/1997 | Boyle et al. |
| 5,813,658 | A | 9/1998 | Kaminski et al. |
| 5,835,657 | A | 11/1998 | Suarez et al. |
| 5,953,475 | A | 9/1999 | Beier et al. |
| 6,129,341 | A | 10/2000 | Griffioen et al. |
| 6,311,953 | B1 | 11/2001 | Lang et al. |
| 6,328,283 | B1 | 12/2001 | Reeve et al. |
| 6,364,290 | B1 | 4/2002 | Barker |
| 6,370,753 | B1 | 4/2002 | Washburn |
| 6,418,264 | B1 | 7/2002 | Hough et al. |
| 6,480,635 | B1 | 11/2002 | Russell et al. |
| 6,631,884 | B2 | 10/2003 | Griffioen et al. |
| 6,694,085 | B2 | 2/2004 | Bergqvist et al. |
| 6,937,033 | B2 | 8/2005 | Boronkay et al. |
| 6,992,580 | B2 | 1/2006 | Kotzin et al. |
| 7,021,426 | B2 | 4/2006 | Griffioen et al. |
| 7,064,559 | B2 | 6/2006 | Bissonnette et al. |
| 7,151,878 | B2 | 12/2006 | Sutehall et al. |
| 7,209,028 | B2 | 4/2007 | Boronkay et al. |
| 7,225,533 | B2 | 6/2007 | Sylvia et al. |
| 7,408,474 | B2 | 8/2008 | Frazier et al. |
| 7,562,861 | B2 | 7/2009 | Fee et al. |
| 7,942,382 | B2 | 5/2011 | Lecoq et al. |
| 8,117,923 | B2 | 2/2012 | Sasaki |
| 8,275,227 | B2 | 9/2012 | Thurlow et al. |
| 8,276,883 | B2 | 10/2012 | Heatley et al. |
| 8,350,581 | B1 | 1/2013 | Brady et al. |
| 2002/0034365 | A1 | 3/2002 | Vogelsang |
| 2002/0121440 | A1 | 9/2002 | Morris |
| 2002/0158239 | A1 | 10/2002 | Griffioen et al. |
| 2003/0001592 | A1 | 1/2003 | Boronkay et al. |
| 2003/0006669 | A1 | 1/2003 | Pei et al. |
| 2003/0222663 | A1 | 12/2003 | Acosta-Geraldino et al. |
| 2004/0135588 | A1 | 7/2004 | Bissonnette et al. |
| 2005/0073327 | A1 | 4/2005 | Walcott |
| 2006/0203086 | A1 * | 9/2006 | Pavlakovic ..................... 348/61 |
| 2006/0219992 | A1 | 10/2006 | Fee et al. |
| 2006/0275008 | A1 | 12/2006 | Xin |
| 2007/0047894 | A1 | 3/2007 | Holmberg et al. |
| 2007/0104447 | A1 | 5/2007 | Allen |
| 2008/0011990 | A1 | 1/2008 | Kostet et al. |
| 2008/0013893 | A1 | 1/2008 | Zheng et al. |
| 2008/0013907 | A1 * | 1/2008 | Zumovitch et al. ........... 385/134 |
| 2008/0050083 | A1 | 2/2008 | Frazier et al. |
| 2008/0267714 | A1 | 10/2008 | Lecoq et al. |
| 2009/0010606 | A1 | 1/2009 | Thurlow et al. |
| 2009/0026429 | A1 | 1/2009 | Barker et al. |
| 2009/0065547 | A1 | 3/2009 | Heatley et al. |
| 2009/0065753 | A1 | 3/2009 | Gonen et al. |
| 2009/0166597 | A1 | 7/2009 | Weaver et al. |
| 2010/0148138 | A1 * | 6/2010 | Baker et al. ............ 254/134.3 R |
| 2010/0155681 | A1 | 6/2010 | Taylor et al. |
| 2011/0006786 | A1 | 1/2011 | Heatley et al. |
| 2011/0062973 | A1 | 3/2011 | Paterson |
| 2011/0079027 | A1 | 4/2011 | Ghan et al. |
| 2011/0084244 | A1 | 4/2011 | Heatley et al. |
| 2011/0135267 | A1 | 6/2011 | Barker et al. |
| 2011/0178713 | A1 | 7/2011 | Barker |
| 2012/0023723 | A1 | 2/2012 | Barker et al. |
| 2013/0011110 | A1 | 1/2013 | Kerry et al. |

FOREIGN PATENT DOCUMENTS

| | | |
|---|---|---|
| DE | 10338950 | 6/2005 |
| EP | 108590 | 5/1984 |
| EP | 253636 | 1/1988 |
| EP | 0292037 | 11/1988 |
| EP | 0294243 | 12/1988 |
| EP | 0319194 | 6/1989 |
| EP | 1273902 | 1/2003 |
| EP | 1333303 | 8/2003 |
| EP | 1593994 | 11/2005 |
| EP | 1022569 | 7/2007 |
| EP | 1832903 | 9/2007 |
| EP | 1832908 | 9/2007 |
| EP | 1843181 | 10/2007 |
| FR | 2 737 053 A1 | 1/1997 |
| FR | 2872299 | 12/2005 |
| GB | 2073440 | 10/1981 |
| GB | 2219662 | 12/1989 |
| GB | 2316496 | 2/1998 |
| GB | 2388966 | 11/2003 |
| JP | 5-328559 | 12/1993 |
| JP | 08163737 | 6/1996 |
| JP | 408178722 | 7/1996 |
| JP | 2000217216 | 8/2000 |
| JP | 4240806 | 3/2009 |
| SU | 1000750 | 2/1983 |
| WO | WO 88/00713 | 1/1988 |
| WO | WO 91/03756 | 3/1991 |
| WO | WO95/23988 | 9/1995 |
| WO | WO98/12588 | 3/1998 |
| WO | WO99/12066 | 3/1999 |
| WO | WO2006/103419 | 10/2006 |
| WO | WO2006/103424 | 10/2006 |
| WO | WO2007/101975 | 9/2007 |
| WO | WO2007104910 | 9/2007 |
| WO | WO2007104913 | 9/2007 |
| WO | WO2007/113544 | 10/2007 |
| WO | WO 2007/113549 A1 | 10/2007 |
| WO | WO2007113519 | 10/2007 |
| WO | WO2007113549 | 10/2007 |
| WO | WO2008/119976 | 10/2008 |
| WO | WO 2009/083722 A1 | 7/2009 |
| WO | WO2009083715 | 7/2009 |
| WO | WO2009083721 | 7/2009 |
| WO | WO2009/131895 | 10/2009 |
| WO | WO2010004288 | 1/2010 |
| WO | WO2010034970 | 4/2010 |

OTHER PUBLICATIONS

Draft Recommended Practices for Cable Installation in Generating Stations and Industrial Facilities, Jan. 2010. 94 pages.

International Search Report for International Application No. PCT/GB2007/003811 mailed Jan. 11, 2008.

Application and File History for U.S. Appl. No. 12/445,844, filed Apr. 16, 2009, inventors Taylor et al.

Application and File History for U.S. Appl. No. 12/810,731, filed Sep. 21, 2010, inventors Heatley et al.

Application and File History for U.S. Appl. No. 12/810,737, filed Dec. 21, 2010, inventors Heatley et al.

Application and File History for U.S. Appl. No. 13/120,124, filed Mar. 21, 2011, inventor Barker.

Application and File History for U.S. Appl. No. 13/260,105, filed Sep. 23, 2011, inventors Barker et al.

International Search Report and Written Opinion for International Application No. PCT/GB2011/000432 dated Jun. 29, 2011.

International Search Report for International Application No. PCT/GB2007/000455 mailed Mar. 28, 2007.

International Search Report for International Application No. PCT/GB2007/001216 mailed Jul. 19, 2007.

FIST-GC02-F, Flat FIST generic closure organizer, Tyco Electronics Raychem, Belgium, as available on Sep. 26, 2012, at http://www.te.com/content/dam/te/global/english/industries/telecom-emea/products/documents/fiber-closures/TC-1032-DS-5-09-11.pdf.

(56) References Cited

OTHER PUBLICATIONS

Application and File History for U.S. Appl. No. 13/637,613, filed Sep. 26, 2012, inventors Kerry et al.
Application and File History for U.S. Appl. No. 12/281,384, filed Sep. 2, 2008, inventors Thurlow et al.
Application and File History for U.S. Appl. No. 12/295,750, filed Oct. 2, 2008, inventors Baker et al.
International Search Report for International Application No. PCT/GB2008/004277 dated May 28, 2009.
International Search Report for International Application No. PCT/GB2008/004281 dated May 28, 2009.
International Search Report for International Application No. PCT/GB2009/002222 dated Feb. 4, 2010.
International Search Report for International Application No. PCT/GB2010/000635 dated May 6, 2011.

* cited by examiner

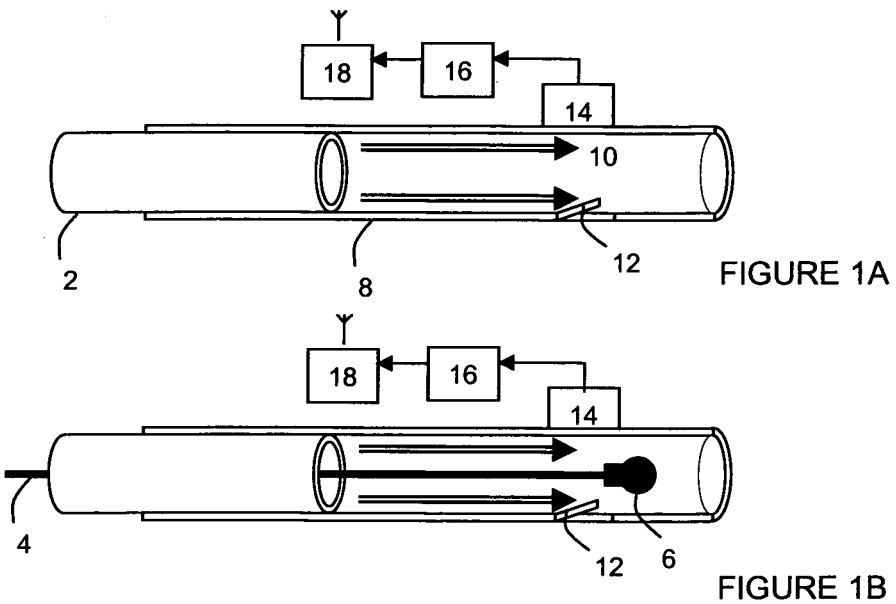
FIGURE 1A
FIGURE 1B
PRIOR ART
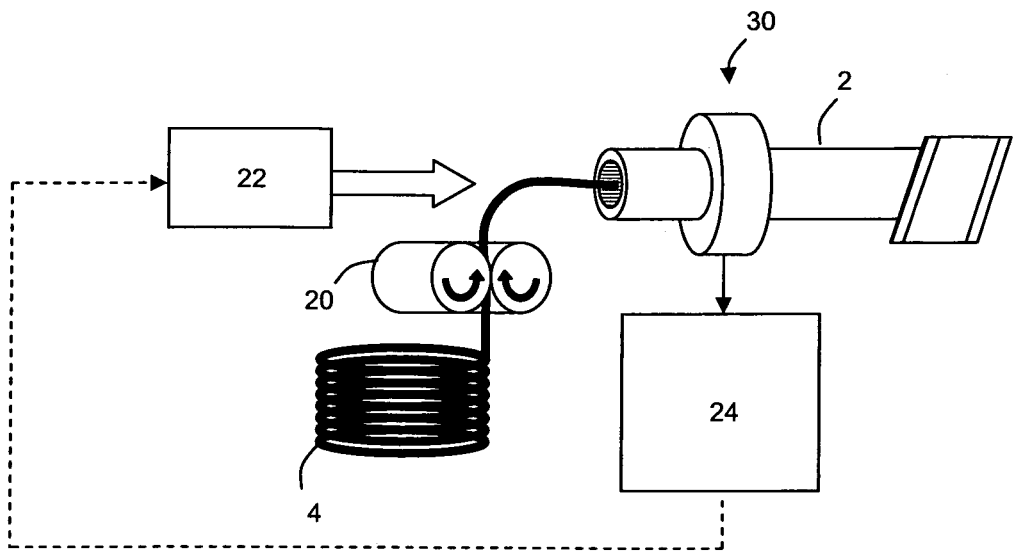
FIGURE 2

PASSIVE REMOTE DETECTION OF GAS FLOW AND CABLE ARRIVAL

RELATED APPLICATIONS

The present application is a National Phase entry of PCT Application No. PCT/GB2010/000487, filed Mar. 18, 2010, which claims priority from European Patent Application No. 09250757.3, filed Mar. 19, 2009, the disclosures of which are hereby incorporated by reference herein in their entirety.

TECHNICAL FIELD

The present invention relates to the installation of cables, such as optical fiber units, wires, electrical cables or the like. More specifically, but not exclusively, the present invention relates to the blowing of fiber unit cables through pre-laid tubes.

BACKGROUND ART

Optical fibers are widely used within telecommunication systems for high-speed information transfer, particularly in the core or backbone network. Central to next generation telecommunications network and the roll out of broadband in e.g. the UK, is an all-optical fiber network throughout the core network which reaches out to customers (corporate users, enterprises, service providers) and the local distribution points that serve residential premises. In time, optical fibers may also extend to all residential premises in the form of an optical fiber extending through the access network to the cabinet, the curb or directly into the premises (FTTx) to the millions of end customers in e.g. the UK.

This entails a major program to install optical fiber which is underway across the UK, involving millions of kilometers of fiber in the field, particularly in the local access which to date has been predominantly a copper domain. The installation method of choice is blown fiber, a technique originally described in applicant's seminal patent EP 108590 and now in widespread commercial use. In short, this involves the installation of a, typically lightweight, optical unit, cable or fiber into a pipe or tube by use at least in part of the viscous drag effect produced by the flow of gaseous medium along the bore of the tube. The gaseous medium is chosen to be compatible with the environment in which the method is performed, and in ordinary environments will be a non-hazardous gas or gas mixture. With the proviso about compatibility with the environment, the gaseous medium is preferably air or nitrogen.

The blown fiber process begins with drawing in a tube (also referred to as a duct or microduct) typically of a plastics material, or more usually a bound and sheathed bundle of tubes, along existing or new underground ducts in the field. Each tube has an inner diameter of typically 2.5-3.5 mm (although larger diameters are also used, commensurate with the size of cable to be installed) which can accommodate a fiber cable containing one fiber or a tight bundle of several fibers. These tubes are laid as a single continuous span between convenient access points such as surface boxes and inspection chambers (manholes) which typically might be hundreds of meters apart in urban settings, reducing to 100 m or less in business districts or like areas. Spans like this are laid in a series along the route that the fiber cable must be laid. When a telecommunication connection is required at a location at or along the fiber cable route, a fiber cable is installed in each span by blowing it down the tube from one end. Alternatively the cable could be blown down a concatenation of spans in one step if circumstances permit. This is repeated for each span, or concatenation of spans, until a continuous fiber path has been laid between the end points of the whole route.

It is crucial to choose the correct tube path at the head end during installation, so that the fiber unit emerges at the desired remote, destination end. During installation however, the operator at one of the installation points would typically be presented with a large number of confusable conduit or tube openings, each representing a path leading to a potentially different destination. The tube openings at each end are usually mapped to their destinations e.g. by color-coding. If however the tube openings are wrongly mapped, or the records otherwise inaccurate, mistakes can result in fibers being blown down the wrong path, with a consequent need perhaps to recover the mis-blown fiber, and the need subsequently to identify the correct conduit end for the desired installation path. This is especially so if the working conditions are poor e.g. in adverse weather or down a manhole or in poor lighting.

Where the path comprises a number of tube lengths linked together by intermediate connectors, yet another problem may lie in broken or incorrect connections between lengths of conduit tubes within the network, so that the fiber unit may get lost within the system during installation and never emerge at the desired destination. Yet another issue may be the possibility that the fiber unit, during installation, could be impeded by an imperfect connection or a tight bend or some other source of friction in the tube, and again never emerge at the chosen destination.

For any of these or other reasons, the fiber unit may, during installation, emerge in the wrong place, or in an extreme case, not at all. Add to that some uncertainty about the exact length of the tube route down which the fiber unit is being installed, so that the operator may not even know in a timely manner when something has gone wrong.

Currently these problems are avoided as far as possible through the use of two engineers or operators during installation, one at each end of the installation tube path. The operator at the head end of the tube path is in charge of the installation process in that he controls the fiber cable ingress apparatus (known as a blowing head which is described in general in e.g. WO88/00713, or the like) and the supply of compressed gas, e.g. a compressor. This head end operator feeds the fiber cable into the tube requiring population in the direction of the second operator located at the remote end of the installation path (i.e. the desired destination). The second operator signals back to the operator at the head end, typically using a walkie-talkie, mobile phone or the like, to confirm that installation gas has arrived at the destination end, before the first operator starts installing the fiber cable into the waiting tube. Upon arrival of the advancing end of the fiber cable at the far end of the tubular path, the second operator signals confirmation of this fact back to the first operator who then concludes the installation process.

The second operator is typically required because the operator at the head end is unable to know the status of the remote end during an installation—since the remote end is typically many tens or hundreds of meters away and is anyway unlikely to be visible to the head end operator.

Consequently, the installation process is relatively labor-intensive, requiring two operators to work on a single installation. This has an impact on the overall cost of optical fiber installation, a problem now especially significant in the FTTP context with scale and considerable installation volumes involved.

Various methods requiring only a single operator installation of blown fiber have been developed, to obtain a significant saving in manpower and hence cost. In the simplest method, the length of the conduit route is known, allowing the operator to know that the fiber has (probably) arrived at the remote end when the required length of fiber unit has been played out. This relies on the map record of conduit route being up to date and accurate, and presumes a smooth and obstruction-free conduit route. Neither of these can be guaranteed in practice.

Another known practice is to install at the remote end of the conduit a barrier of porous material such as an "airstone" which is constructed of a porous material which allows gas through but which will stop further progress of the fiber unit. The airstone is temporarily placed at the mouth of the destination remote end of the tube conduit. When the fiber ceases to travel down the tube, this is an indication that the far end of the fiber may have reached the destination end and has been retained by the airstone barrier. However, lack of further progress is ambiguous as to whether the fiber unit has indeed reached the porous airstone at the destination end, or if instead the fiber unit is caught on an obstruction at some intermediate point along the length of the conduit.

These, together with other methods like those described in WO9103756 or WO/9812588, also describe how fiber arrival can be detected by the single operator at the head end of the installation; the initial step of detecting that the compressed gas fed into the head tube end is not addressed in the above techniques.

One method, developed by the applicants of the present case and described in PCT application GB2008/004284, describes a gas flow and fiber cable sensing methodology using a whistle arrangement. When compressed gas is fed into the correct tube at the head end, it will eventually flow through the remote end of the tube to which is attached a device including the whistle arrangement, which produces an acoustic status signal indicating gas arrival When the fiber cable subsequently arrives at the remote end it interacts with the resonant cavity of the whistle arrangement device to cause the frequency of the sound produced by gas flow over or through the whistle arrangement to change (in tone or to cease). The status signal and any changes thereto are detected at the remote end, where the detector is either physically or operatively coupled to the device at the remote end, and then conveyed to the engineer at the head end over a conventional radio channel. This shortcoming in the methodology may affect its adoption for wide-scale deployment, as the availability and resilience of that channel cannot be guaranteed in a field setting, owing to the tube ends being routinely located below ground, which adversely affects the transmission and reception of the status signal at the head end. Furthermore, the electronic circuitry (signal amplifier, signal processor, radio transmitter, etc) necessarily co-located with the whistle arrangement device at the remote location typically requires a local power source, such as a battery, which raises maintenance issues.

SUMMARY OF THE INVENTION

In general, embodiments of the present invention provide methods and devices for aspects relating to the installation of cables such as optical fiber units into conduit tubes using e.g. the blown fiber method, so that in particular, a single operator can operate substantially on his own at the head end, to determine if compressed gas and/or the fiber cable or unit fed into a conduit has reached its intended destination, and to then signal the arrival of gas and/or the fiber cable back to the head end in a way which avoids or reduces the disadvantages suffered above. Embodiments can be used where the operator has to choose between one of a number of conduits, or where there is a single conduit but where it is desirable to unambiguously confirm that the installation gas and/or the fiber unit will reach or reaches the intended destination. In view of the possible volumes that can be deployed in FTTx initiatives, embodiments also address the need for cost-efficiency in being relatively cheap to manufacture and simple to operate.

Detection apparatus is deployed at the location where the operator is controlling the blown fiber installation session at the head end of the optical fiber tube to be populated. This is used to detect an acoustic signal—which comprises an audible or inaudible sound caused by gas vibrations—generated at a location remote from the operator, specifically which indicates the arrival of the gas flow and/or fiber optical fiber cable or unit at the far end of the tube. As the signal can travel a significant distance from the remote far end of the tube to the near end where the detection apparatus is located, it is likely to be relatively faint.

Noise levels at the head end where the gaseous medium and the fiber unit are being installed into the tube are high, which makes the task of recognizing or identifying the presence of the signal from the far end even more difficult. Furthermore, the signal generally travels in a direction opposite to that of the gaseous medium and fiber unit progressing through the fiber tube. For this reason, the detector is operatively connected to a signal processing unit. This comprises circuitry which receives as an input from the detector the detected sound and vibrations within the tube at the near end, and processes the input to identify and isolate any signal indicative of a status change at the far end within the input obtained.

Embodiments provide a system for use in installation of blown fiber for detecting a signal indicative of presence of at least one of a gas flow or an optical fiber at a remote location, comprising a gas vibration detector configured to acoustically couple with a fiber tube through which the signal can travel after its generation at the remote location, and a processor arranged to receive an input from the vibration detector and to process the input to identify the signal present within the input; and a sensor for generating the signal upon sensing the presence of at least one of the gas flow or the fiber at the remote location.

The detection apparatus of embodiments, which is to be used at the head end of the tube being populated, is configured to operate in conjunction with a sensing device deployed at the remote far end of the tube.

In an embodiment, the sensing device is one including a whistle arrangement which senses the absence or presence of a gas flow and/or a fiber unit. Changes in the status (i.e. absence or presence) are registered as being indicative of gas (e.g. air) and/or fiber unit arrival at the remote far end of the tube.

In one embodiment, the sensing device and the detecting device are deployed on opposite ends of the same fiber tube to be populated by the optical fiber. In a further embodiment, the sensing device is placed on the far end of the fiber tube to be populated by fiber, while the detecting device is acoustically coupled e.g. by physically fitting it onto the end of a specifically-designated detection tube which ideally runs substantially parallel to the fiber tube, but which ends co-terminate, in any event. The sound or vibration signal generated by the sensor is coupled into the detection tube by using a connecting piece which can comprise a tube shape so that one end can be positioned next to the sound or vibration generator (e.g. the whistle arrangement).

In another embodiment, there is provided a method for detecting a signal indicative of presence of at least one of a gas flow or an optical fiber at a remote location, comprising installing at the remote location a sensor for generating the signal upon sensing the presence of at least one of the gas flow or the optical fiber at the remote location, installing detection apparatus on a fiber tube through which the signal is travelling from the remote location, processing an input generated by the vibration detector to identify the signal present within the input.

The detection apparatus at the head end is used in concert with the sensing unit at the far end, where the detector can be deployed on the fiber tube being populated, or a dedicated detection tube which ends co-terminate with the fiber tube. The signal received at the end is identified by "cleaning up" the received input from the sound vibration detector using various signal processing methods and circuitry.

BRIEF DESCRIPTION OF THE DRAWINGS

Embodiments will now be described, by way of example only, with reference to the accompanying drawings, in which:

FIGS. 1A and 1B depict a far-end sensor of the prior art in use during gas flow and fiber arrival detection;

FIG. 2 depicts a head-end detector according to an embodiment;

DETAILED DESCRIPTION

Figure 3A:
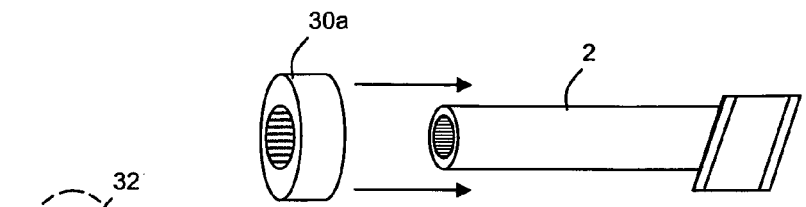
FIGS. 3A and 3B depict further embodiments of the detector.

FIGS. 1A and 1B depict a sensor component (1) of the type which is described in PCT application GB2008/004284, the disclosure of which is hereby incorporated by reference herein in its entirety. This is fitted onto an end of an optical fiber tube (2), which extends from a near or local, end to a far, or remote, end, often as part of a network of conduits and tubes. Optical fiber is installed using the blown fiber method described above, from the near end towards the far end. In use, the operator first travels to the far end of the tube to fit the sensor unit onto the end of the tube which is to be populated by the optical fiber, before travelling back to the head end to operate the apparatus (typically comprising a blowing head and a compressor) to install the fiber into and through the tube.

As shown in FIG. 1, the sensor comprises a substantially cylindrical (which need not be of circular section) or tubular housing (8) which is open at both ends. The housing of the unit includes a whistle arrangement comprising a tongue/aperture construction (12) which is configured to introduce turbulence in gas (10) flowing past the construction such that the gas vibrates. Any frequency/pitch (constant or changing) produced by the whistle arrangement can be used, although there can be benefit in it being in the middle/upper audio range in order to be sufficiently distinct from background noise. Ultrasonic frequencies can also be used, with the added benefit that they would not be heard by passers-by or attract unwanted attention to the unmanned remote end location. However the propagation efficiency of sonic pressure waves increases with decreasing frequency and hence frequencies within a human audible range can be preferred in a practical setting, for example a single tone or a modulated tone centred on 400 Hz or 1 kHz.

A microphone (14) or other device capable of detecting the gas vibrations, whistling sound or acoustic property of the vibrating gas is provided in the sensor device, which is operatively connected to a radio frequency (RF) transmitter (18). Optionally, in an embodiment, the microphone is connected to an amplifier (16) to boost the acoustic signal. Upon detection of the acoustic tone or signal, a signal can thus be sent via radio broadcast to the operator at the head end operating the fiber installation apparatus, providing confirmation that installation gas (e.g. air) is being fed down the correct tube at the head-end.

Having received the radio transmission, the operator can now feed the optical fiber (4)—whose tip or end is typically fitted with a bead (6)—into the tube at the head end with confidence that the correct tube has been selected at the head end. As shown in FIG. 1B, the beaded fiber tip at the far end passes out of the tube end into the sensor unit (1) and past the whistle arrangement (12). This causes a change in the acoustic or tone generated by the gas flow: this change is sensed and transmitted from the far- to the head-end again as using radio transmission. Upon receipt of this radio signal confirming fiber arrival at the far end, the operator can terminate the installation process.

Embodiments of the detection methods and apparatus are advantageously used in conjunction with a far-end sensor of the type described above and in connection with FIGS. 1A and 1B, but without the radio frequency transmitter, although it is within the scope of the invention to use this detector with any acoustic or vibration sensor deployed at the remote end of the tube.

An embodiment of a detection unit (30) according to an embodiment is shown in FIG. 2 which shows it in use in a typical head-end set up for installing optical fiber (4) into the optical fiber tube (2). Such a set up includes a blowing head (20) comprising driving wheels which impart a mechanical driving force to drive the fiber into the fiber. The fiber installation process also involves pumping compressed gas, for example air from a compressor (22) into the tube, so that the optical fiber is driven into and through the tube from head end to far end.

During use, any vibrations or tones produced by the whistle arrangement of the far-end sensor propagate through the gaseous medium within the bore of the tube in all directions, including in an upstream direction towards the head end. This is against the flow of gas in the tube, however the speed of sound far exceeds the flow rate of the gas and hence sound propagation along the conduit to the head end will be largely unaffected by the oncoming flow of gas.

As is well known, however, the intensity of sound or vibration diminishes or attenuates with distance from its source, consequently the closer the sound or vibration is to the head end of the conduit the quieter/less intense it becomes. Conversely, the sound or vibration produced by the gas being injected into the tube at the head end becomes louder when moving in that location. In other words the far-end signal to background noise ratio reduces along the tube when moving in the direction of the head end.

As the sensor unit is physically coupled to the tube, signals produced by the whistle arrangement at the far end would also be acoustically coupled to the tube and be conducted along its entire length to eventually reach the head end. This augments the signal travelling to the head end via the gas through the bore. It should be noted however that as and when optical fiber cable advances along the tube during its installation, increasingly large parts of the inner volume of the conduit will be occupied by the fiber, which will reduce the intensity of the sound or vibration from the far end detected at the head end.

The detector unit (30) deployed at the head end can comprise a sound or vibration detector (e.g. a microphone) which is fixed or otherwise coupled to the tube being monitored. In the embodiment shown in FIG. 2, this is interference- or friction-fitted onto the tube to ensure secure engagement and good acoustic or vibrational coupling. In use, the detector operates on the principle of "listening" or "feeling" for the acoustic or vibration generated by the sensor at the far end of the tube. In an embodiment, the detector component can be operatively connected to a signal processing unit (24) which takes as an input the signal (which will probably be a relatively low level signal by the time it reaches the head end, for the reasons described above) detected by the detector and amplifies and "cleans it up" in the manner described in greater detail below in connection with FIG. 4. Specifically, the signal processing component comprises conventional electrical circuitry for signal amplification, filtering and recognition, noise cancellation and the like. For example, the digital signal filtering and sound recognition techniques and components commonly used in echo sounding and seismology can be used, since they too enable very faint signals to be detected against substantially high background noise and interference.

Processing the detected signal in this manner reduces the sensitivity of the detector to local noise sources such as an air compressor, and seeks to isolate the signal from the far-end sensor from background noise. This goes towards the positive identification of a signal indicative of gas flow and/or optical fiber arrival at the remote end.

In an embodiment, the output of the detector circuitry is a simple status: e.g., where 0=no signal is detected, 1=a signal (with any additional validated characteristics as described above) is detected. Alternatively, in another embodiment, the status can be 0=a signal with characteristics X is detected, and 1=a signal with characteristics Y is detected, where X and Y can be different in spectral content (e.g., frequency, or chirp) or other property. In either case the status, or change in status, can be conveyed to the operator using any method (e.g., visually, aurally, vibrationally) who then knows with high confidence that the gas is being applied to the correct tube, and fiber installation and ingress can commence.

Significantly however, the detection of the activation of the far-end sensor takes place at the near end i.e. at the location where the lone operator is controlling the blown fiber installation process and apparatus.

In an embodiment, the signal filtering aspect of the signal processing unit is configured to be sensitive to the particular frequency or range of frequencies of the sound or vibration expected to be received from the far-end sensor. The electronic circuitry can also be arranged so that during the sound recognition stage, the particular characteristics of the signal (e.g. its spectral content in the frequency domain) can be picked up and identified, allowing for the signal from the sensor to be distinguished against other noise such as the background sound of rushing gas especially at the head end. The sound recognition capability can be further enhanced by use of a sound or vibration with pre-determined characteristics, e.g. which intensity and/or frequency modulates or "chirps". The detector and associated signal processor can be configured to specifically detect such vibrations or sounds for optimal detection and recognition.

Given the need for a sufficient level of sensitivity to enable distinguishing between what is likely to be a weak, low-level signal from significant background noise, the sound or vibration sensor element (30) of the detector can be capable of being well-coupled to the input end of the conduit to enable good acoustic coupling of the signal travelling from the far end.

FIG. 3A shows an embodiment of the detector unit, in which the microphone or vibration sensor (30a) takes the form of a ring or a torus which the operator pushes over the tube end as indicated by the arrows. In an embodiment, the inner surface of the detector contacts the tube at the most responsive or sensitive area of the microphone or vibration sensor, e.g. as shown in the shaded portion of the cut-away view of the detector portion (in dotted circles) being the internal wall of the annular detector. The detector is shown in the figures to be simply push-fit into place, although the skilled person would appreciate that other connection methods such a screwing the device onto the tube end, snap-fitting it on, etc., is possible.

Figure 3B:
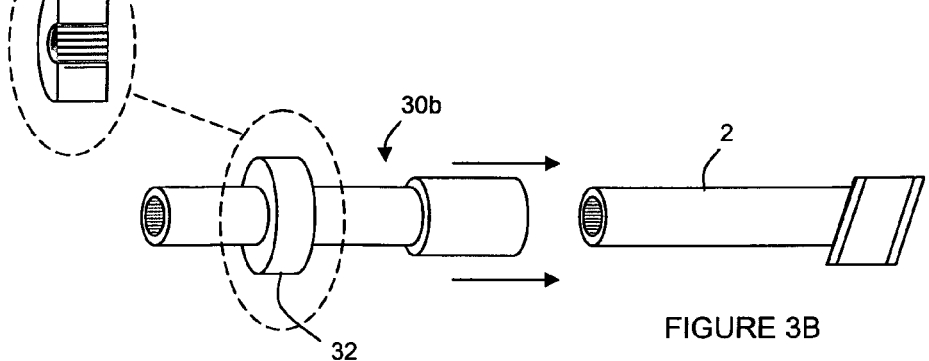

Another embodiment of the detector component (30b) is shown in FIG. 3B in which the detector comprises a length of piping or tubing arranged to fit onto the head end of the optical fiber cable tube (2), by e.g. a tight push- or interference-fit in the direction of the tube as indicated by the arrows. The microphone or vibration sensor portion (32) is part of and integrated into tubular detector unit, which can take the form of a ring around the external surface of the tube as shown in FIG. 3B, which includes the microphone or gas vibration sensing elements.

The skilled person will appreciate that the microphone or vibration detecting element need not take the form of a ring, and other ways of providing the detection means on or along the tubular unit are possible. For example, the microphone can be a small singular device coupled to just one side of the tube and held in place by a clip, for example a circular clip, around the tube or by other suitable mechanical means. Providing the detection means in this way allows the microphone or vibration detector to be designed with minimal or no physical barrier between its most receptive area (again, shown in detail by the shaded portion being the interior wall of the ring-shaped detector) and the inner region of the tube where it can be expected that the signal propagated from the sensor end is the strongest.

As noted above, the signal generated by the sensor at the far end and propagated or transmitted to the operator's end comprises an acoustic signal produced by the whistle arrangement in the presence of a turbulent gas flow. In other words, a tone (audible or otherwise) is generated where previously there was substantially no tone. Following on from the confirmation that gas (e.g. air) is flowing through the sensor, an optical fiber cable or unit is fed into and through the tube. When the fiber arrives at and exits the far end into the sensor unit, the presence of the leading end of the fiber (4), especially the protective bead (6), causes a change in the characteristics of the whistle's signal (e.g. intensity, frequency, a chirp) in the signal indicating gas flow. This change can be temporary (e.g. when the bead passes over the whistle opening in the sensor housing) or it can be a more durable change (e.g. if the bead lodges itself in a position within the housing in such as way as to reduce or stop gas from flowing through the whistle opening) so that the tone indicating flow of gas is silenced.

The head-end detector (30) can be configured to detect any such change in the acoustic signal or gas vibration when it occurs—whether in the form of a changed, or the cessation, of the previously-detected tone.

Figure 4:
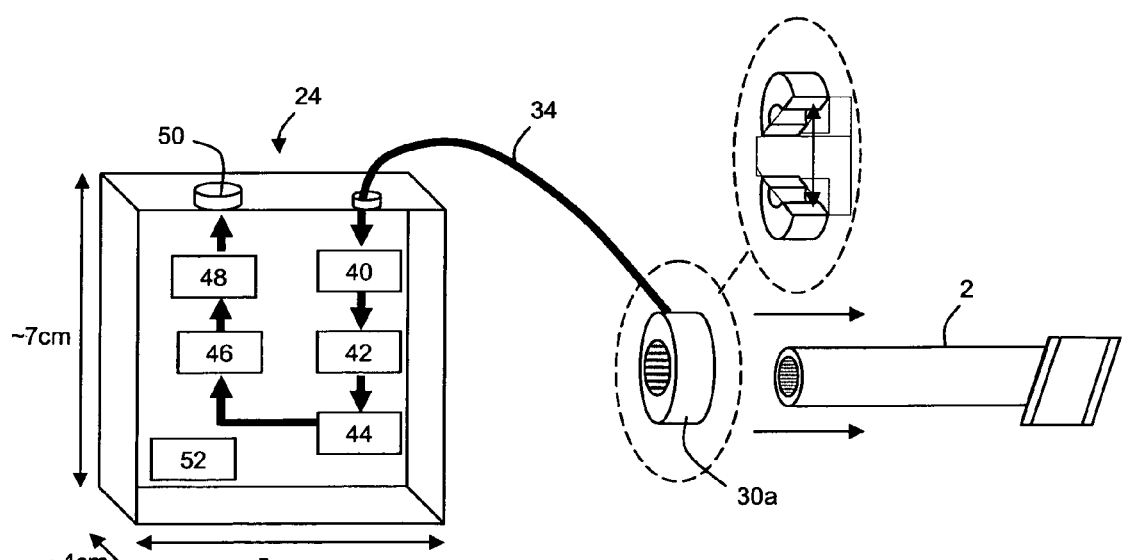
FIG. 4 depicts an implementation of the detector with a signal processing unit according to an embodiment.

The practical implementation of the detector unit or assembly (30) at the head end can take a variety of forms depending on operational needs or preferences. One example is shown in FIG. 4 where the detector assembly comprises two discrete units: the microphone or vibration sensor element (30a) applied to the tube, which is electronically linked to the electronic signal processing unit (24) by a connecting or "umbilical" cable (34). The tethered connection between the units can in an appropriate case (e.g. a short-range or near-field implementation spanning a few meters) be replaced with a wireless connection. Widely available short-range radio wireless technologies such as Bluetooth and Zigbee can be adapted for use in this embodiment. In such an embodiment, the detector unit (30) would need to be integrated with some of the elements shown in the electronic signal processing unit (24) in order to generate a suitable data signal that can then be transmitted via radio to the remaining elements in the signal processing unit (24) using known and conventional methods of implementation.

This arrangement minimizes the complexity and size of the detector unit (30) (which can be made to about 5×4×7 cm in size, in an embodiment) attached to the tube (2), which can be a priority during use in the field. As shown in the figure, the electronic unit (24) comprises modules which receive as an input the raw sound and vibration data detected by the detection portion (30) within the tube, to process the same to provide a clearer and more definitive indication of any signal sent by the sensor at the far end indicative of gas or fiber cable arrival. Specifically, the electronic unit can include a low noise amplifier (40), a noise cancellation unit (42), a narrow-band signal filter (44), a signal recognition and extractor module (46) and a component to generate a status alert (48). Together, these functionalities process the data received from the detector, to help isolate any signal therein received from the far end of the tube from the noise of the head end of the tube.

In an embodiment, the electronic signal processing unit further includes a status alert indicator (50) which conveys the status of the sensor at the remote end (i.e. the presence, absence or any change in the sound or vibration) as detected at the head end. The indicator works by conveying the status to the operator by visual (e.g. LED) or aural (e.g. buzzer) means or by any suitable alternative means.

Power required by the signal processing circuitry (24) can be provided by the use of a battery (52), which can be provided on board and integral to the signal processing unit. Alternatively power can be obtained by electrically cabling it up to the power source driving the cable installation apparatus (e.g. the blowing head and/or the compressor), or the apparatus themselves, which are located in the immediate vicinity.

Figure 5:
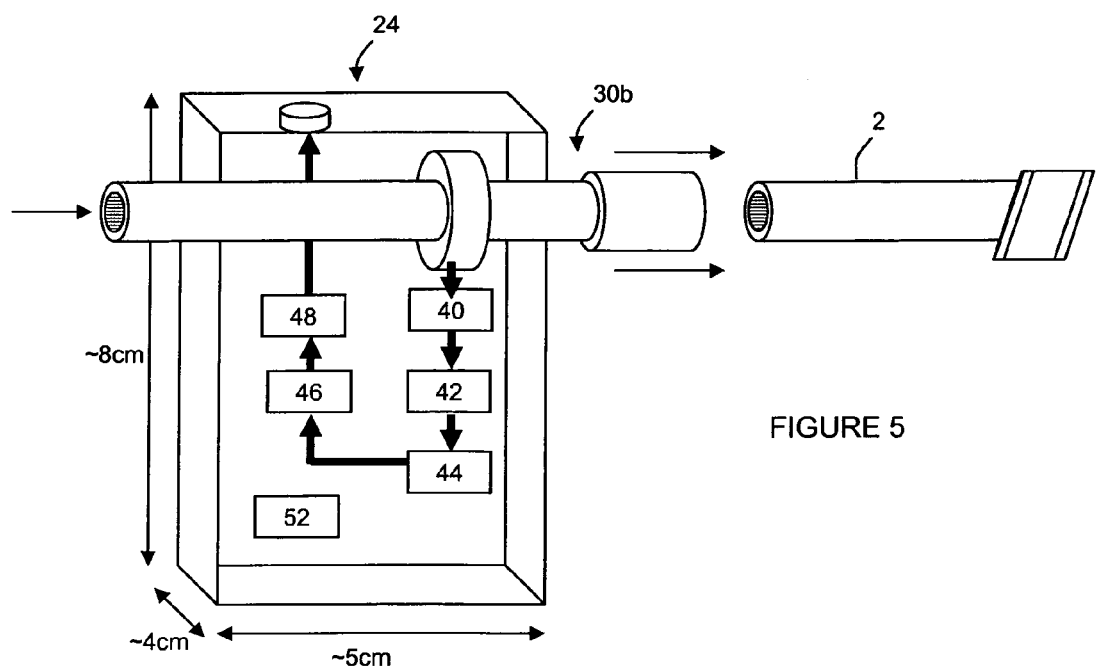
FIG. 5 depicts an alternative implementation of the detector with a processor unit according to an embodiment.

An alternative embodiment is shown in FIG. 5, wherein the tubular detector (30b) and circuitry for signal processing (24) are combined into a single unit, which is coupled to the end of the tube (2). The overall size of the combined unit can be made to about 5×4×7 cm in size, in an embodiment, which is light and small enough to be used with optical fiber tubes of the type used for blown fiber.

Multiple Tube Deployment

In above embodiment described in connection with FIGS. 2 to 5, the remote end detection methodology can be used for local or head end detection of gas and fiber arrival at the far end of a single tube, i.e. the same tube into which the gas and/or fiber are being fed. In practice, optical fiber tubes are often and more usually deployed in bundles of up to 24 individual tubes, particularly from the local cabinet or exchange back into the network, and throughout the core network. For convenience, the present description will refer to such bundles of tubes as conduits, which are typically encased within an external protective sheathing. Along the routes described by conduits laid along them, individual tubes can be broken out (i.e. the sheathing cut open) at certain points along the route to allow the particular individual tubes to be led to different destination points. Often however, tubes within a conduit share common head and remote ends in that they lead from and to the same places.

The use of the far-end sensor (8) and the near-end detector (30) in concert in the manner described above, can also be used in a multiple tube implementation in a tube bundle. The embodiment shown in FIGS. 6 and 7 take advantage of the fact that there is likely to be a "spare" tube (in the sense that it is not already used or populated by a fiber unit or cable) running alongside within a common conduit, or at least sharing common head and remote ends, to the tube through which gas and the fiber cable are being fed. In such an embodiment, the spare tube serves to convey any acoustic signal from the sensor placed on the tube to be populated by the fiber cable or unit to the detector at the head end.

Figure 6:
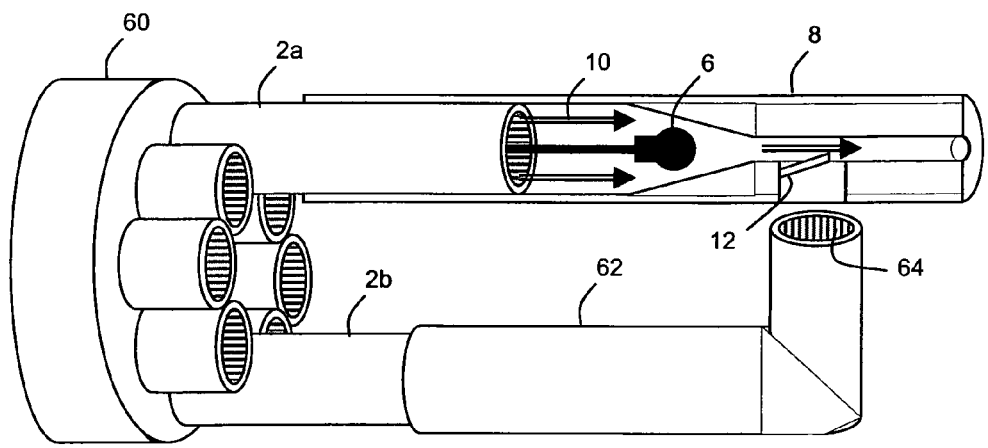
FIG. 6 depicts the use of a second detection connection tube at the far end of the tube system according to an embodiment.

As shown in FIG. 6, the attachment and operation of the sensor (8) at the far end is identical to that described earlier, in that the operative identifies the end of the tube (2a) intended to be populated by a fiber unit using the blown fiber method, and affixes the sensor. It can be noted that the sensor unit (8) shown in FIG. 6 is merely an alternative embodiment of that shown in FIGS. 1A and 1B, wherein the central bore of the housing narrows along its length so that on fiber arrival, the bead (6) on the tip of the fiber unit (4) substantially reduces or blocks the amount of gas passing through or over the whistle arrangement—which provides a clear change in the signal previously generated to indicate fiber arrival.

As a further step, a second, spare tube (2b) is identified to serve as a detection tube. A connection tube (62) being a short length of rigid or flexible piping configured to fit onto the end of the detection tube (2b) at one end, so that the other tube end preferably opens towards the whistle arrangement (12), or is at least capable of being acoustically coupled with any tone generated by the whistle arrangement during use. In an embodiment, the open end of the detection connection tube can be positioned within the immediate vicinity of the whistle opening for optimal reception of any signal generated as shown in FIG. 6.

In such an embodiment, the use of the detection tube (2b) is dedicated to the single, or main, purpose of transmitting any acoustic or vibration signal from the far end to the head end for detection. It can be expected that using the detection tube which has a reduced noise level compared to the tube to be populated (following the absence of gas rushing against the direction of transmission of the signal within the tube bore), would allow for superior signal transmission back to the head end. In an embodiment, where a number of spare tubes within the conduit are available, the operator can choose to use one which is located as far away from the tube being populated as possible, so as to isolate the detection tube, as far as possible, from the noise created by gas (e.g. air or nitrogen) rushing through the tube being populated.

Figure 7:
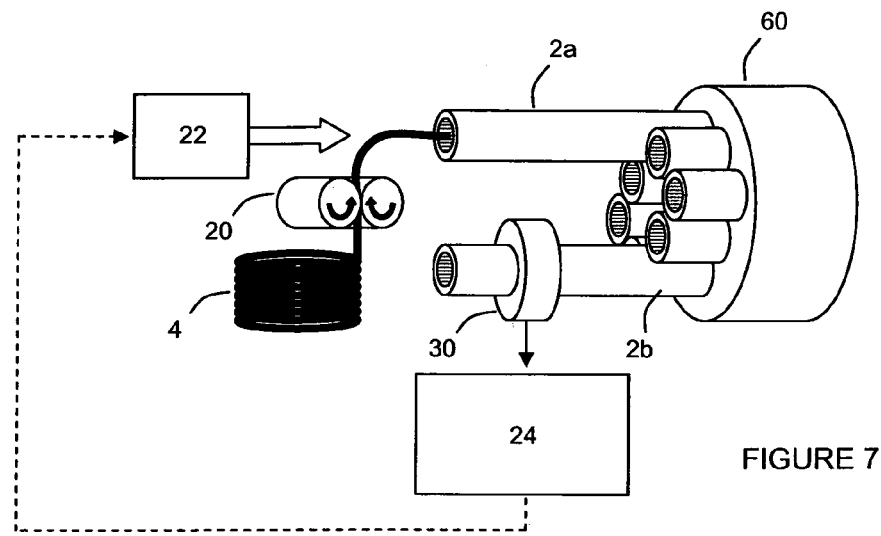
FIG. 7 depicts the use of a second detection connection tube at the head end of the tube system according to an embodiment.

FIG. 7 depicts head end arrangement of the multiple tube deployment, according to an embodiment. The fiber installation apparatus—i.e. the blowing head (20) and the compressor (22)—is similar or identical to that described earlier in connection with FIG. 2. The detector (30) and the associated electronic circuitry for signal processing (24) is now connected to the second, detection tube (2b).

As noted above, the absence of gas flow in the detection tube enables the detector to operate in a quieter environment compared with the tube being populated (2a), even if the detector is likely to pick up noise associated with the population of the first tube (2a). Moreover, the detector torus is designed to have its most responsive or sensitive area facing inwards towards to the interior of the tube, so detection of some nearby noise sources is unlikely to detract excessively from the detection process.

Figure 8:
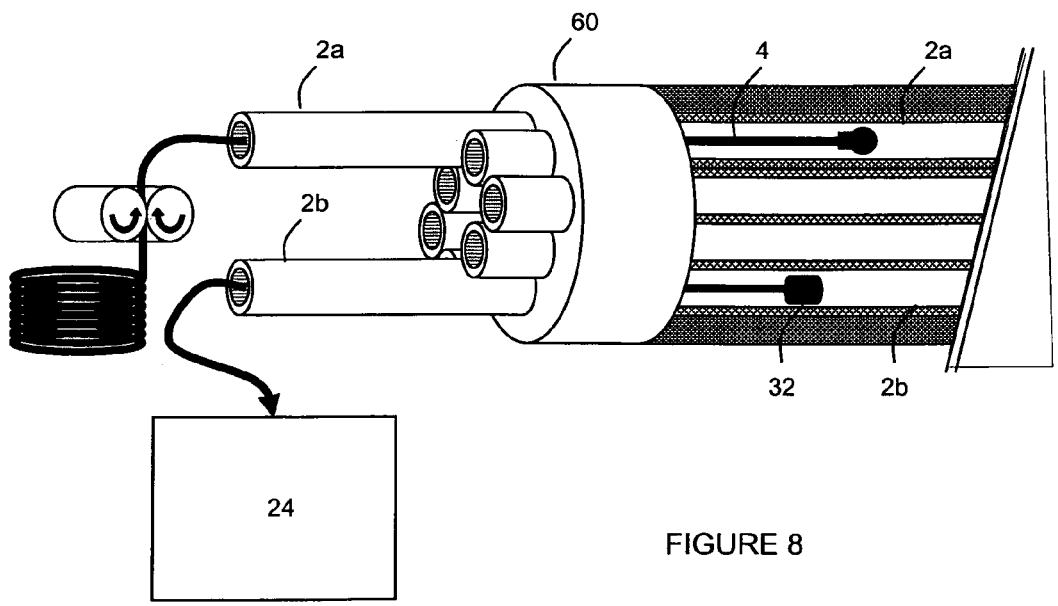
FIG. 8 depicts an alternative implementation of the detection arrangement at the head end according to an embodiment.

The use of a spare tube for detection purposes in this manner additionally affords the flexibility to place the detection component in positions optimized for detecting the signal from the remote end. In the cutaway section shown in the embodiment of FIG. 8, the detection unit (32) is inserted into the detection tube (2b). This is connected to the external electronic circuitry for signal processing (24) at the head end by the connection or umbilical cable (34) described earlier in connection with FIG. 4.

A detector unit (32) suitably designed to fit inside the tube can be inserted several meters into the detection tube (2b) by using a push rod or the umbilical cable itself if it is sufficiently rigid. A suitably designed detector can be installed in place several meters into the tube using the blowing head ingress machine used to install fiber cable. In either case, placing the detector further into the tube reduces the pick up of noise generated by the installation apparatus (20, 22) at the head end, thus improving the efficiency of the detector to detect signals from the far-end sensor against background noise. At the end of the installation process, the detector can be recovered simply by pulling on the umbilical cable.

Figure 9:
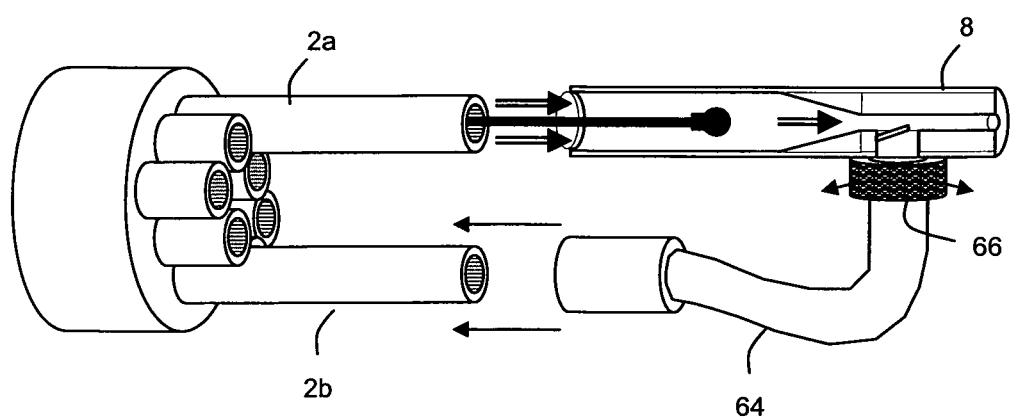
FIG. 9 depicts an alternative implementation of the detection tube at the far end according to an embodiment.

The skilled person would appreciate that various alternatives and possibilities are available, within the scope of the invention, for the placement of the detection unit (30, 32) at the near end, and the manner in which the far-end signal can be acoustically coupled to the detection tube at the far end. In another embodiment shown in FIG. 9, the sensor fixed to the tube being populated (2a) is connected to the detection tube (2b) by way of a flexible tube (64) leading from the whistle element (12) to the detection tube (2b). A reverse arrangement is equally valid, where the whistle is located at the end of the flex tube fixed to the detection tube. To enable the whistle to work, the mating region between the sensor enclosure and flexible tube can comprise a gas-porous barrier which allows gas flowing out from the mouth of the tube being populated and into the sensing device (8) to escape via a gauze grille (66). The mating region also provides secure mechanical coupling (by way of a push-fit, screw threads or the like) between the sensor housing and the flexible tube.

The methods, devices, components and configurations described above and in the drawings are for ease of description only and not meant to restrict the invention to any particular embodiments. Various sequences and permutations on the methods and devices described are possible within the scope of this invention as disclosed; similarly the invention can be used in various similar scenarios and for various cable and conduit types and sizes. In particular, the apparatus and methods relating to gas flow detection and the methods and apparatus relating to fiber arrival detection are depicted in this description to be used together in an embodiment. However they will work independently of each other on their own. In particular, the head end and remote end components are not configured to work only with each other, but can work with other components capable of producing the same output. So for example, the detector at the head end is capable of using as an input any acoustic or vibration signal capable of being detected by a suitable detector (such as microphone or the like), to detect a tone change (e.g. from substantial silence to a specific tone, or changes in the tone, audible or otherwise).

The invention claimed is:

1. A system, for use in installation of blown fiber through a fiber tube having a first end and a second end for detecting a signal indicative of a presence of at least one of a gas flow or an optical fiber at the second end of the fiber tube, the system comprising:
    a sensor configured to generate a signal at the second end of the fiber tube upon sensing the presence of the at least one of the gas flow or the optical fiber at the second end of the fiber tube;
    a gas vibration detector installed at the first end of the fiber tube configured to acoustically couple with the first end of the fiber tube for receiving the signal generated at the second end of the fiber tube; and
    a processor arranged to receive an input from the gas vibration detector,
    such that the generated signal is detected at the first end of the fiber tube.

2. A system according to claim 1, wherein the gas vibration detector comprises an annulus including a microphone, the gas vibration detector being configured to fit around the fiber tube during use.

3. A system according to claim 1, wherein the gas vibration detector comprises a pipe and a microphone, the gas vibration detector being configured to fit on an end of the fiber tube during use.

4. A system according to claim 1, wherein the gas vibration detector is configured to acoustically couple with an internal wall of the fiber tube.

5. A system according to claim 1, wherein the processor in use includes one or more components for processing the input from the gas vibration detector, being a low noise amplifier, a noise cancellation unit, a narrowband signal filter, a signal recognition arrangement or an extractor module.

6. A system according to claim 1, further comprising a fiber tube to which the gas vibration detector is acoustically coupled at the first end, and to which the sensor is coupled at the second end.

7. A system according to claim 1, further comprising:
    a detection tube having a first end which substantially co-terminates with the first end of the fiber tube, and a second end which substantially co-terminates with the second end of the fiber tube; and
    a connecting tube configured to acoustically couple the signal generated by the sensor to the detection tube.

8. A system according to claim 1, wherein the sensor comprises:
    a sensing element arranged to detect an acoustic property change caused by generation of a tone having a first pitch, and
    an actuator for causing the acoustic property change detectable by the detector,
    wherein in use, presence of at least one of a gas flow or an optical fiber causes the actuator to generate an acoustic property change sensed by the sensing element.

9. A method, for use in installation of blown fiber through a fiber tube having a first end and a second end, for detecting a signal indicative of a presence of at least one of a gas flow or an optical fiber at the second end of the fiber tube, comprising:
    using a sensor to generate a signal at the second end of the fiber tube upon sensing the presence of the at least one of the gas flow or the optical fiber at the second end of the fiber tube;

using detection apparatus to detect the signal generated at the second end of the fiber tube, the detection apparatus comprising:
- a gas vibration detector installed at the first end, configured to acoustically couple with the first end of the fiber tube for receiving the signal generated at the second end of the fiber tube; and
- a processor arranged to receive an input from the gas vibration detector.

10. A method according to claim 9, further comprising feeding at least one of a gas flow or an optical fiber into the fiber tube towards the second end of the fiber tube.

11. A method according to claim 9, further comprising providing or identifying a detection tube having a first end which substantially co-terminates with the first end of the fiber tube, and a second end which substantially co-terminates with the second end of the fiber tube, comprising:
- installing the gas vibration detector comprises installation on the first end of the detection tube;
- installing the sensor comprises installation on the second end of the detection tube; and
- in use, the signal travels through the detection tube from its second end for detection by the vibration detector.

12. A method according to claim 9, wherein processing an input comprises using at least one of using a low noise amplifier, a noise cancellation unit, a narrowband signal filter, a signal recognition arrangement or an extractor module.

13. A system according to claim 1, wherein the gas vibration detector comprises an annulus including a microphone, the gas vibration detector being configured to fit around the fiber tube during use.

14. A system according to claim 1, wherein the gas vibration detector comprises a pipe and a microphone, the gas vibration detector being configured to fit on an end of the fiber tube during use.

15. A system according to claim 1, wherein the gas vibration detector is configured to acoustically couple with an internal wall of the fiber tube.

16. A system according to claim 1, wherein the processor in use includes one or more components for processing the input from the gas vibration detector, being a low noise amplifier, a noise cancellation unit, a narrowband signal filter, a signal recognition arrangement or an extractor module.

17. A system according to claim 1, further comprising the filter tube to which a detection apparatus is acoustically coupled at one end or the fiber tube, and the sensor is coupled at the other end of the fiber tube.

* * * * *